United States Patent [19]

Bosik et al.

[11] 4,253,131
[45] Feb. 24, 1981

[54] REPEATER OVERLOAD CIRCUIT

[75] Inventors: Barry S. Bosik, Parsippany, N.J.;
Jeffrey H. Derby, New York, N.Y.;
Tadikonda N. Rao, Morris Township,
Morris County, N.J.

[73] Assignee: Bell Telephone Laboratories,
Incorporated, Murray Hill, N.J.

[21] Appl. No.: 974,388

[22] Filed: Dec. 29, 1978

[51] Int. Cl.³ .................................. H02H 9/04
[52] U.S. Cl. ........................ 361/119; 330/207 P
[58] Field of Search ............... 361/119; 330/207 P;
179/170 R, 170 J, 170 T

[56] References Cited

U.S. PATENT DOCUMENTS

| | | | |
|---|---|---|---|
| 4,106,070 | 8/1978 | Gordon et al. | 361/42 |
| 4,161,008 | 7/1979 | Zimmermann et al. | 361/119 |

Primary Examiner—Harry E. Moose, Jr.
Attorney, Agent, or Firm—Robert O. Nimtz

[57] ABSTRACT

A bilateral repeater for communication transmission lines is described in which the opposite directions of transmission are separated by frequency bands for amplification. The repeater is powered from a power conversion unit energized from the line potential. The repeater includes three-electrode gas tube breakdown devices connected across the repeater for each conductor of the transmission line. The third electrodes in the gas tubes are cross-connected together with no ground connection.

1 Claim, 1 Drawing Figure

REPEATER OVERLOAD CIRCUIT

BACKGROUND OF THE INVENTION

1. Field of the Invention

This invention relates to overload protection circuits and, more particularly, to lightning protection for transmission line repeaters.

2. Description of the Prior Art

Transmission line repeaters are located at spaced positions along a transmission line and serve the function of amplifying communication signals transmitted in either or both directions along the transmission line. Such repeaters are made up of electronic components which might become seriously damaged by exposure to excessive voltages caused, for example, by lightning strikes on the transmission line. Since such transmission lines are often exposed to the elements, the probability of a damaging lightning strike is reasonably high during the lifetime of the repeater.

It is therefore common to protect such repeaters by means of voltage breakdown devices which respond to excessive voltages by creating a temporary short circuit between the transmission line and ground potential. Current surges are thereby deflected to ground and do not harm the electrical components of the repeater.

In order to permit deflection of current surges to ground, a high current capacity ground connection must be provided at each repeater location to accommodate the shunted current. Such ground connections can be difficult and expensive to provide for repeaters on some types of transmission lines, such as aerial cables, where a ground connection is not immediately available.

SUMMARY OF THE INVENTION

In accordance with the illustrative embodiment of the present invention, voltage breakdown devices are provided between the input and the output of a transmission line repeater with no connection to ground. The large voltages on the transmission line are hereby shunted around repeater components without providing an easy path to ground. This arrangement eliminates the need for a ground connection at each repeater site.

In the case of a multiconductor transmission line, such as a telephone cable pair, each conductor is separately shunted around the repeater components. In this arrangement, the voltage breakdown devices connected in series with each conductor path also include third electrodes which are connected together to prevent excessive voltages from building up between the two conductors of the transmission line in the presence of lightning strikes. In this way, the same breakdown devices protect against voltage surges across the input (and output) of the repeater as well as between repeater input and output.

BRIEF DESCRIPTION OF THE DRAWING

In the single drawing there is shown a detailed block diagram of a repeater configuration utilizing the lightning protection circuits of the present invention.

DETAILED DESCRIPTION

Figure 1:
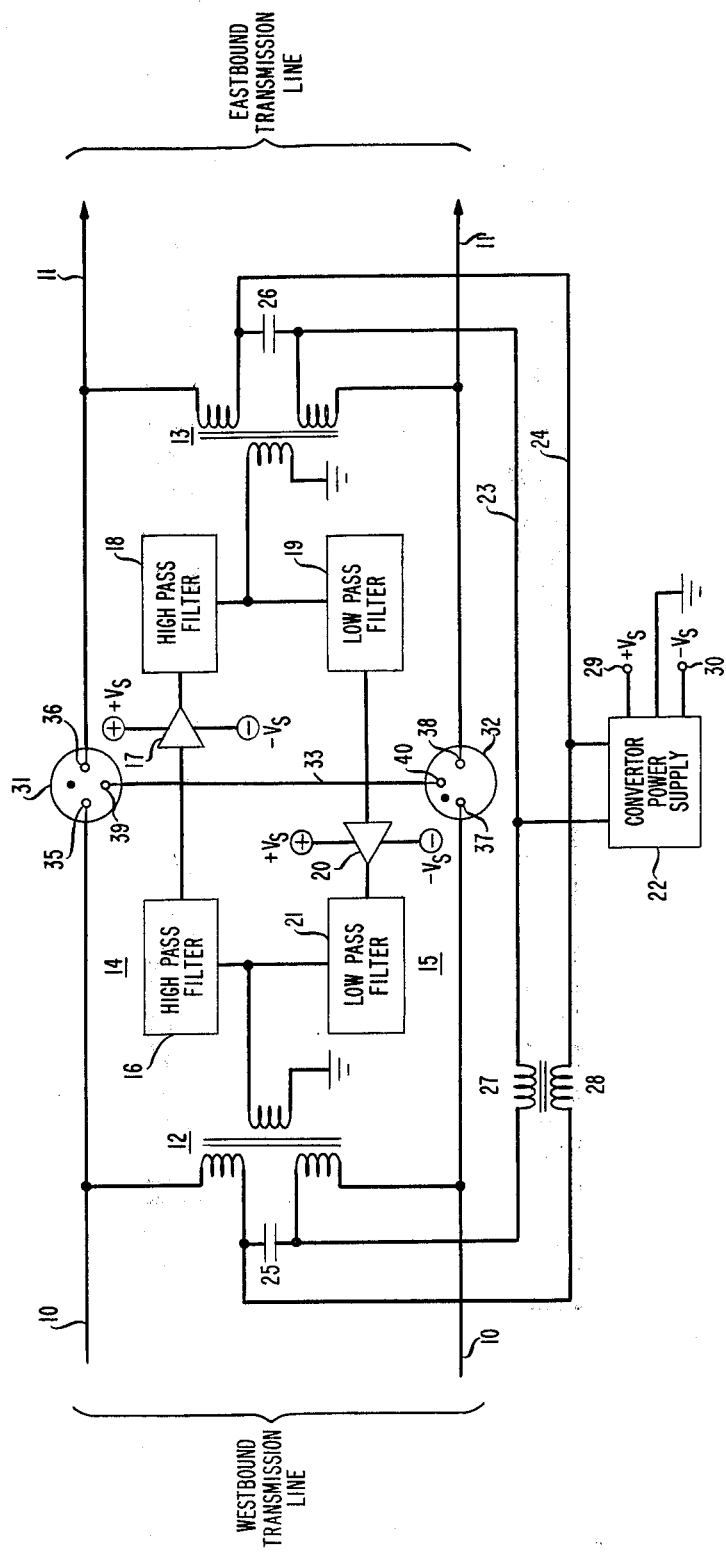

In the single FIGURE of the drawing there is shown a detailed block diagram of a standard transmission line repeater utilizing the lightning protection arrangements of the present invention. The repeater in the drawing is connected between a two-wire westbound transmission line 10 and a two-wire eastbound transmission line 11. Transmission lines 10 and 11 in the illustrative embodiment may, for example, comprise a telephone cable pair for a subscriber loop carrier system of the type disclosed in an application of B. S. Bosik, Ser. No. 974,384, filed of even date herewith.

The repeater in the drawing includes a pair of transformer 12 and 13 to which the transmission lines 10 and 11 are respectively connected. Connected between the remaining windings of transformer 12 and transformer 13 is a bidirectional amplifying circuit circuit including an eastbound path 14 and a westbound path 15. A high-pass filter 16 for the eastbound carrier frequency group separates the eastbound signal from the westbound signal for amplification in repeater amplifier 17. The output of amplifier 17 is applied through high-pass filter 18, which likewise isolates the eastbound carrier frequency group from the westbound group, to transformer 13.

A low-pass filter 19 similarly separates the westbound carrier signal group for application to amplifier 20. The output of amplifier 20 is applied through westbound carrier group low-pass filter 21 to transformer 12.

It can thus be seen that the repeater of the drawing amplifies modulated carrier signals traveling in both directions on transmission lines 10 and 11 by separating these signals into frequency bands unique for each direction of transmission.

Operating power for the electrical components of the repeater of the drawing is provided by a power conversion unit 22. The power converter unit is connected across bypass wires 23 and 24 which serve to bypass direct current around the repeater between transmission lines 10 and 11. Capacitors 25 and 26 isolate the conductors of transmission lines 10 and 11, respectively, with regard to the flow of direct current. Mutually coupled inductors 27 and 28 in bypass conductors 23 and 24, respectively, form a low-pass filter to minimize the amount of alternating current communication signal which flows through bypass conductors 23 and 24. Power supply 22 provides a positive operating voltage at terminal 29 and a negative operating voltage at terminal 30 for the electrical components of the balance of the repeater.

In accordance with the present invention, a voltage breakdown device 31, which may comprise, for example, a three-electrode voltage breakdown gas tube, is connected between the upper conductors of transmission lines 10 and 11 by way of electrodes 35 and 36, respectively. Similarly, a three-electrode voltage breakdown device 32 is connected between the lower conductors of transmission lines 10 and 11, respectively, by way of electrodes 37 and 38. Voltage breakdown devices 31 and 32 are designed to provide very high isolating impedances until fired by a voltage across electrode pairs 35-36 or 37-38 exceeding a preselected minimum. At this minimum threshold voltage, devices 31 and 32 break down to provide a low impedance, easy conduction path between the connected conductors of transmission lines 10 and 11.

It will be noted that devices 31 and 32 provide an easy conduction path for currents caused by large voltage differences between the conductors of transmission line 10 and transmission line 11. Contrary to standard protector design, an easy conduction path to ground is not provided and hence there is no necessity to provide a ground connection at the repeater. The absence of a ground connection obviates the need for bringing an earth ground connection to the repeater location which, in many cases, might be inconvenient or expensive to provide.

A third electrode in each of breakdown devices 31 and 32, electrode 39 in device 31 and electrode 40 in device 32 are connected together by way of lead 33. Thus, when a large voltage exists between conductors 10 or between conductors 11, breakdown devices 31 and 32 break down and the voltages across the conductors 10 or 11 are short-circuited by current flow through conductor 33. This prevents large voltages from building up between the conductors of transmission line 10 or the conductors of transmission line 11. Such large voltages might well break down the insulation of these conductors and cause damage to the transmission lines or to the components of the repeater itself.

We claim:

1. A high voltage protection circuit for electronic components connected between segments of a transmission line

CHARACTERIZED BY a three-electrode gas voltage breakdown device connected in series with each of the corresponding conductive paths of said transmission line segments, said voltage breakdown device providing, by way of two of the electrodes of said voltage breakdown device, nongrounded current conduction between said conductive paths in the voltage breakdown state, and a nongrounded current conducting connection between the third electrodes of said voltage breakdown devices.

* * * * *